Sept. 17, 1968  K. G. CROWE  3,401,871
METHOD FOR MAKING BLOWER ASSEMBLY
Filed Dec. 12, 1966
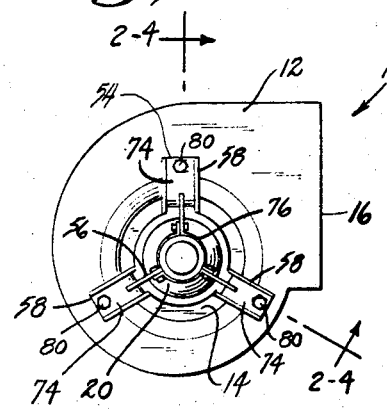
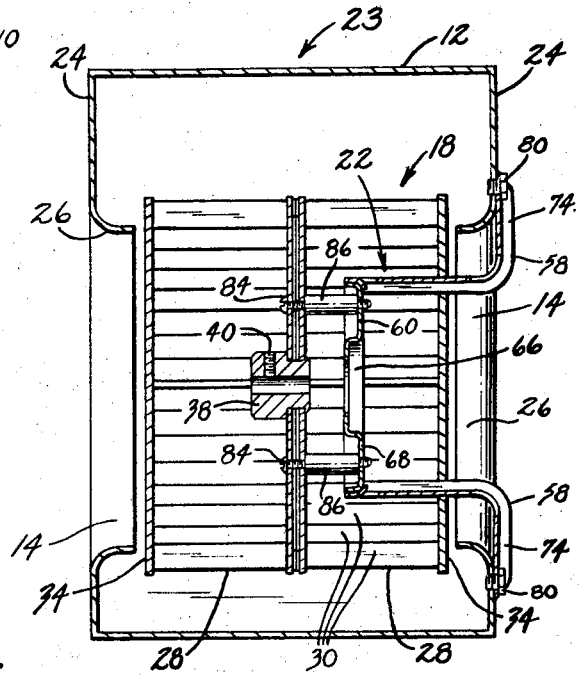
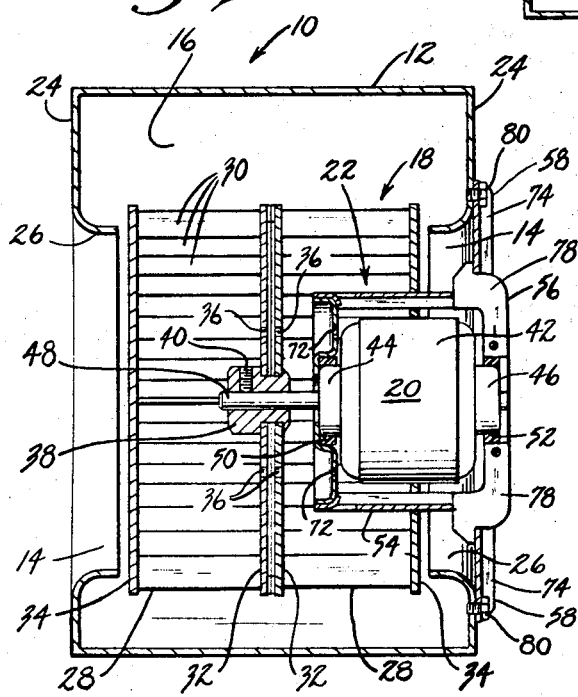
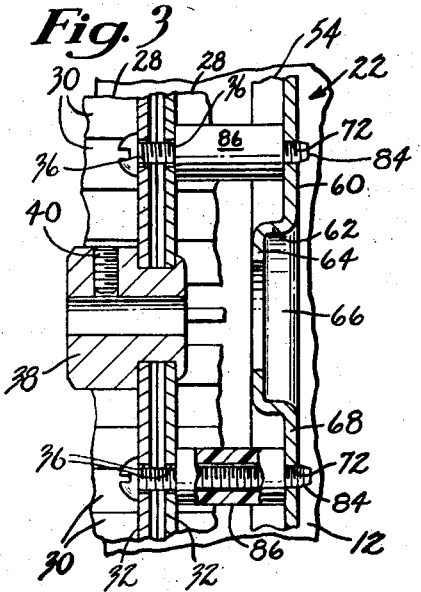
INVENTOR.
KENNETH G. CROWE
BY
McCormick, Paulding & Huber
ATTORNEYS

United States Patent Office 3,401,871
Patented Sept. 17, 1968

3,401,871
METHOD FOR MAKING BLOWER ASSEMBLY
Kenneth G. Crowe, Rhode-Ste.-Genese, Belgium, assignor to The Torrington Manufacturing Company, Torrington, Conn., a corporation of Connecticut
Filed Dec. 12, 1966, Ser. No. 601,155
9 Claims. (Cl. 230—117)

This invention relates to a method for making a blower assembly and deals more particularly with a method for making a blower assembly of the direct-drive type in which a motor supported in a blower housing and directly connected with a rotor supports the rotor therein.

The general object of this invention is to provide an improved method for making a blower assembly of the aforedescribed character wherein component handling operations are eliminated or at least substantially reduced.

A further object of this invention is to provide an improved method for making a blower assembly of the aforedescribed type to facilitate the more efficient application of a surface coating to various components comprising the assembly.

Still another object of the invention is to provide an improved blower sub-assembly whereby time and skill required to make a blower assembly therefrom is substantially reduced.

Other objects and advantages of the present invention will be apparent from the description that follows and from the drawing forming a part thereof.

The drawing illustrates a preferred method of practicing the invention and such method will be described, but it will be understood that various changes may be made from the process disclosed, and that the drawing and description are not to be construed as defining or limiting the scope of the invention, the claims forming a part of this specification being relied upon for that purpose.

Of the drawing:

FIG. 1 is a side elevational view of a blower assembly made in accordance with the method of the present invention.

FIG. 2 is a sectional view through the blower of FIG. 1 taken along the line 2—2 of FIG. 1 but shows the blower in a partially assembled condition, the housing and motor support bracket being fastened together and the rotor being temporarily fastened thereto to form a sub-assembly.

FIG. 3 is a somewhat enlarged fragmentary view showing a fastener means for retaining the rotor in a temporarily assembled condition with the motor mounting bracket as it appears in FIG. 2.

FIG. 4 is a sectional view through the blower of FIG. 1 taken along the line 4—4 of FIG. 1 and shows the blower in a fully assembled condition.

In FIGS. 1 and 4 of the drawing, the number 10 designates a centrifugal blower assembly made in accordance with this invention. The blower assembly 10 hereinafter generally described is substantially identical to the blower assembly disclosed in my copending application Ser. No. 600,573, filed Dec. 9, 1966, and entitled "Blower Assembly" and for a more detailed description of this assembly reference may be had to the aforeidentified application.

The blower assembly 10 is of the direct drive type and generally comprises a housing 12 having at least one air inlet opening 14 and an air outlet opening 16 and providing an enclosure for an air impeller or rotor indicated generally at 18. Power for driving the rotor is provided by a motor 20 which also serves to support the rotor in its operational position within the housing. The motor 20 is in turn supported by a motor mount assembly indicated generally at 22 and secured to a wall of the housing.

In accordance with the method of the present invention, prior to the installation of the motor, the rotor 18 is temporarily secured to a part of the motor mount assembly 22 to form a sub-assembly indicated generally at 23 in FIG. 2 which is further handled and processed as a unit, thereby substantially reducing individual component handling and processing operations. In its temporarily assembled condition the rotor 18 is supported in its operational position by the aforesaid motor mount part. The time and degree of skill required to position the motor and connect it with the rotor to complete the assembly is thereby substantially reduced.

Further considering the structure of the blower 10, it will be noted that the housing 12 is characterized by thin walls, a generally volute or scroll-shape, and a generally rectangular cross section. It is preferably made from sheet metal or like material and has substantially identical side walls 24, 24, each of which includes a bell-mouth portion 26 defining a circular inlet opening 14 which communicates with the housing interior.

The rotor 18 is generally drum-shaped and is of such size that it may be inserted into the housing through one of the openings therein. It is assembled from two parts or blower wheels 28, 28 of substantially equal diameter and opposite hands fastened together in back-to-back relationship. Each wheel 28 includes a circumaxially spaced series of axially elongated air moving blades 30, 30 retained in assembly by a radially disposed generally circular support member or inner disc 32 and an outer ring 34 which defines an open end of the rotor. Each disc 32 has a plurality of circumaxially spaced screw-receiving apertures 36, 36 therein. The two wheels 28, 28 are held together in assembly by a hub 38 so that the apertures 36, 36 in each disc 32 are axially aligned with the apertures in the other disc as best shown in FIG. 3. The hub 38 is centrally bored and is provided with a set screw 40 for securing the rotor to a shaft on the motor.

The invention may be practiced with motors of various types. Preferably, however, and as shown the motor 20 has a generally cylindrical casing 42 including coaxially extending front and rear end portions of somewhat reduced diameter respectively indicated at 44 and 46. Projecting coaxially forwardly from the front end portion 44 is a drive shaft 48 adapted to be received in the bore of the hub 38. Annular cushion members 50 and 52 made from rubber or like material respectively coaxially surround the motor end portions 44 and 46 and cooperate with the motor mount assembly 22 to absorb motor and rotor vibration.

The motor mount assembly supports the motor and its associated rotor in a cantilever position relative to a wall of the housing and may take various forms. In the presently preferred embodiment of the invention, the motor mount assembly 22 generally comprises a motor support bracket and a spider respectively indicated at 54 and 56. Considering first the support bracket and referring particularly to FIGS. 2 and 3, the bracket 54 has a body portion formed by three generally L-shaped arms 58, 58 which carry a forward end portion or cradle 60 which in turn supports the front end of the motor. The cradle 60 is preferably formed from sheet metal and has an axially disposed annular wall portion 62 and a radially disposed wall portion 64 centrally apertured to permit the shaft to extend forwardly therethrough. The wall portions 62 and 64 define a cylindrical rearwardly opening central recess 66 which receives and supports the cushion member 50 and the associated motor end portion 44. An integrally formed annular wall 68 surrounds the recess 66 and extends radially outwardly beyond the outer surface of the motor casing 42 terminating in a forwardly extending annular wall 70 to which the arms 58, 58 are welded. To facilitate temporary connection between the rotor and the cradle the annular wall 68 has a plurality of circumaxially spaced screw-receiving apertures 72, 72 therein which are arranged so that each aperture is axially alignable with an associated pair of apertures 36, 36 in the discs 32, 32 when the rotor is in an operational position. Each arm 58 extends rearwardly from the cradle and has a radially extending free end portion 74 which is fastened to an associated housing wall 24 exteriorly of the housing 12.

Support for the motor rear end portion 44 is provided by the spider 56 which has a segmented central portion 76 engaging the motor casing 42 in axially spaced relation to the support cradle 52. A plurality of angularly spaced legs 78, 78 each project generally radially outwardly from the central portion 76 to interlockingly engage an associated arm 58. The segments which form the central portion 76 are joined in assembly by suitable fasteners to form a band clampingly surrounding the cushion member 52 at the rear of the motor as best shown in FIG. 1, thereby securing the motor against movement relative to the blower housing.

In assembling the blower 10 in accordance with the method of the present invention, the rotor 18 is preferably first inserted into the housing through the outlet opening and is positioned therein in general coaxial alignment with the inlet openings 14, 14. Thereafter, the motor support bracket is inserted into the housing through one of the inlet openings 14 and the radially extending portions 74, 74 are brought into engagement with an associated housing wall 24 and are secured thereto by fasteners 80, 80. At this point it should be noted that the rotor 18 in its assembled or operational position partially surrounds the motor 20 and its associated support bracket 22 and it is for this reason that the rotor is inserted into the housing before the motor mount bracket is inserted therein. However, when rotors of other types are used in practicing the invention the order in which the components are inserted into the housing may be reversed.

After the support bracket 54 has been fastened to an associated housing wall 24 the rotor 18 is temporarily secured to the bracket to form the sub-assembly 23. Various fastening means may be provided for making this temporary connection, however, preferably a plurality of expendable elongated metal screws 84, 84 of the self-tapping type and a plurality of associated expendable tubular spacers 86, 86 are employed for this purpose. Each screw is inserted through a pair of associated apertures 36, 36 in the rotor support members 32, 32 and threadably engages an associated aperture 72 in the cradle member wall 68 to provide an electrically conductive connection between the two parts. Plastic or like material may be used to make the spacers 86, 86, each of which is received on an associated screw between the rear support member 32 and the cradle wall 68. The spacers serve to maintain the rotor in properly spaced relationship to the motor support bracket and to the walls of the housing.

As previously noted the sub-assembly 23 is handled and further processed as a unit. Such processing generally includes the application of a surface coating compound to the various components comprising the sub-assembly. While various surface finishing processes may be employed in practicing the invention, the present method is particularly adaptable for use in combination with a surface finishing process wherein the various components of the sub-assembly 23 are uniformly exposed to a finishing medium. Such preferred finishing processes generally include various electrolytic processes such as electroplating, electrophoretic painting and the like.

In accordance with the presently preferred method of practicing the invention, an electrophoretic painting process is employed to simultaneously apply a surface coating to the components of the sub-assembly 23. The aforesaid process, well known to thoe skilled in the art, includes the step of immersing the sub-assembly 23 in a fluid bath containing a paint suspension, paint particles being deposited on the componets under the action of an applied electromotive force.

In some instances, the sub-assembly 23 may be manufactured and shipped to a customer for further assembly with a motor to be furnished by the customer. When the components are shipped as a sub-assembly no further packing operations are required other than those normally required in packing and shipping the housing.

It will also be evident that when blower components are to be stored for assembly with a motor at some later time a substantial saving in storage space is effected by handling the components as a sub-assembly in accordance with the present method. Further benefit is derived from having a proper combination of components simultaneously arrive at an assembly station.

The blower assembly is completed by inserting the motor 20 into the support bracket 54 so that the shaft 46 extends into the bore of the hub 36. Each spider leg 78 is brought into interlocking engagement with an associated arm 58. The segments which form the spider central portion 76 are thereafter fastened together in clamping engagement with the cushion member 50 to complete the motor mount assembly 22 and thereby secure the motor 20 against movement relative to the housing 12. After the set screw 40 is tightened to secure the hub 38 to the motor shaft 48, the fasteners 72, 72 and the associated spacers 86, 86 are removed leaving the rotor in its operational position in the housing 12. No further operations are required to affect proper rotor alignment.

The invention claimed is:

1. A method for making a blower assembly having a housing including an air outlet opening and at least one wall having an air inlet opening therethrough, a motor support bracket secured to said one wall extending forwardly into said housing in general coaxial alignment with said inlet opening and including a forward end portion spaced from said one wall, a motor carried by said support bracket and having a rotatable shaft extending axially forwardly beyond said support bracket forward end portion, and a rotor having a circumaxially spaced series of axially elongated air moving blades and including a hub receiving said motor shaft, said rotor in an operational position being normally supported by said motor shaft in radially and axially spaced relation to the walls of said housing; said method comprising the steps of inserting said rotor into said housing through one of the said openings therein, inserting said motor support bracket into said housing through one of the said openings therein, fastening said support bracket to said housing in general coaxial alignment with said inlet opening, providing fastening means for attaching said rotor to said support bracket, and temporarily attaching said rotor to said support bracket in said operational position with said fastening means.

2. A method for making a blower assembly as set forth in claim 1 including the additional step of applying a surface coating to said housing, said rotor and said support bracket, said additional step being performed after the step of temporarily attaching said rotor to said support bracket.

3. The method as set forth in claim 2 wherein the step of applying a surface coating is further characterized as immersing said housing, rotor, and motor support bracket in an electrophoretic painting bath.

4. A method for making a blower assembly as set forth in claim 1 including the additional steps of inserting said motor into said motor mount and the shaft of said motor into the hub of said rotor, fastening said hub to said motor shaft, securing said motor to said motor mounting bracket, and removing said fastening means.

5. A method for making a blower assembly as set forth in claim 1 wherein said rotor includes a generally radially disposed support member connecting said blades and said hub, wherein said support bracket forward end portion includes a generally radially disposed wall and wherein the step of temporarily attaching is further characterized as attaching said rotor support member to said support bracket wall.

6. A blower sub-assembly adapted for assembly with a blower drive motor having an axially projecting drive shaft and comprising a blower housing having an air outlet opening and including at least one wall having an air inlet opening therethrough, a motor support bracket secured to said one wall extending forwardly into said housing in general coaxial alignment with said inlet opening, said support bracket including a forward end portion spaced from said one wall and being adapted to receive and support the motor with the shaft thereof extending forwardly beyond said forward end portion, a rotor disposed within said housing having a circumaxially spaced series of axially elongated air moving blades and including a hub adapted to receive the motor shaft, said motor in an operational position being normally supported by the motor shaft in radially and axially spaced relation to the walls of said housing, and fastening means temporarily connecting said rotor and said support bracket to maintain said rotor in said operational position in said sub-assembly in the absence of the motor.

7. A blower sub-assembly as set forth in claim 6 wherein said housing, said support bracket and said rotor are made of electrically conductive material and wherein said fastening means also provides means for electrically connecting said rotor to said support bracket and said housing.

8. A blower sub-assembly as set forth in claim 6 wherein said support bracket forward end portion has a generally radially disposed wall portion and said rotor includes a generally radially disposed support member connecting said blades and said hub and wherein said fastening means comprises a plurality of elongated circumaxially spaced axially extending screws connecting said wall portion and said support member.

9. A blower sub-assembly as set forth in claim 8 wherein said fastening means includes a plurality of elongated tubular spacers, each of the said spacers being received on an associated one of the said screws and extending between said wall portion and said support member.

References Cited

UNITED STATES PATENTS

| | | | |
|---|---|---|---|
| 2,639,087 | 5/1953 | Goede | 230—117 |
| 2,686,630 | 8/1954 | Burrowes | 230—128 |
| 2,781,165 | 2/1957 | Troller | 230—117 |
| 3,127,092 | 3/1964 | Shenberger | 230—128 |
| 3,159,108 | 12/1964 | Mullings | 230—128 |

HENRY F. RADUAZO, *Primary Examiner.*